Aug. 30, 1955   F. G. HODGES, JR   2,716,308
APPARATUS FOR MAKING SPRING UNITS
Filed June 20, 1946   8 Sheets-Sheet 1

INVENTOR.
Frederick G. Hodges Jr.
BY
Moore, Olson & Trexler
attys.

Aug. 30, 1955  F. G. HODGES, JR  2,716,308
APPARATUS FOR MAKING SPRING UNITS
Filed June 20, 1946  8 Sheets-Sheet 2

INVENTOR.
Frederick G. Hodges Jr.
By: Moore, Olson & Trexler
attys.

Aug. 30, 1955  F. G. HODGES, JR  2,716,308
APPARATUS FOR MAKING SPRING UNITS
Filed June 20, 1946  8 Sheets-Sheet 3

INVENTOR.
Frederick G. Hodges Jr.
BY
Moore, Olson & Trexler
attys.

United States Patent Office 2,716,308
Patented Aug. 30, 1955

2,716,308

APPARATUS FOR MAKING SPRING UNITS

Frederick G. Hodges, Jr., Janesville, Wis.

Application June 20, 1946, Serial No. 678,068

30 Claims. (Cl. 45—138)

This invention relates to methods and apparatus for manufacturing spring units such as are employed in the manufacture of mattresses, cushions, and like spring-filled articles.

In my prior Patent No. 2,382,226, dated August 14, 1945, means and methods are disclosed for effecting the manufacture of spring units for cushions, mattresses and the like, wherein the spring units are composed of a series of coil springs secured together and between sheets of padding such as sisal or the like, by securing means which joins the juxtaposed springs to each other and also to the sisal padding. More specifically, staples are projected through the sisal and around the springs, whereby the juxtaposed spring portions are secured together and to the sisal padding. The processes are effected continuously, the spring rows being fed progressively between the elongated sisal strips, and severed at intervals, to form the spring units of desired size. In said patent the springs are directly connected together in only one direction, as for example longitudinally, the springs being held relative to each other in the opposite or lateral direction through the intermediary of the connected sisal.

In accordance with the present invention means and methods are provided for effecting the manufacture of spring units of the foregoing type, but wherein the springs are secured directly together, and to the sisal, both laterally and longitudinally, as may in certain instances be desired to impart increased strength, durability, or stiffness to the spring units.

It is accordingly an object of the present invention to provide improved methods and apparatus for effecting the manufacture of spring units of the type stated, wherein the springs are directly connected together both laterally and longitudinally, to effect the production of a more closely knit and interconnected spring unit structure.

A further object of the invention is to provide improved methods and apparatus for effecting the securing of the springs, longitudinally and laterally, while simultaneously effecting the securing of the springs to sheet material, as for example sisal padding, or the like, forming a part of the spring unit structures.

A further object of the invention is to provide improved means and methods for effecting the manufacture of spring units of the type defined, wherein the operations may be conducted continuously and progressively, to effect the progressive production of units of any desired dimension and size.

A still further object of the invention is to provide means and methods for effecting the manufacture of spring units of improved construction, and having improved operating characteristics, which means and methods may be rapidly and efficiently effected in the high speed and low cost production of spring units and structures.

Various other objects, advantages and features of the invention will be apparent from the following specification when taken in connection with the accompanying drawings, wherein a preferred embodiment is set forth for purposes of illustration.

In the drawings, wherein like reference numerals refer to like parts throughout.

General machine arrangement and method

The machine comprises in general, means for feeding coil springs, of the type conventionally employed in the manufacture of mattresses and cushions, from a suitable hopper structure or supply source into a predetermined position or pickup station, wherein the springs are aligned in horizontal spaced relationship with their axes relatively parallel to each other. At said station the springs are rotatably indexed so as to bring the knot or tie portions thereof, conventionally provided in such springs, into a predetermined angular relationship. A series of shuttles, one for each spring, descend as a unit, picking up the springs and moving them downwardly and laterally toward each other substantially into contact and between a pair of elongated webs of sisal padding, the padding being brought into engagement with the end faces of the springs. When the springs have been brought into position, substantially in contact and between the sisal padding, a series of stapling heads operate, with the shuttles acting as anvils, so as to project staples through the sisal padding and around the juxtaposed spring portions so as to form the spring and padding structure. The operations are repeated sequentially, a new horizontal line of springs being brought into position at each machine cycle so as to form spring units of desired size, the widths of the units being determined by the number of shuttles in the machine, and the length of the units being determined by the number of sequential machine operations. At predetermined spaced points the feeding of the springs is omitted, thus determining the length of the spring units, and suitable cut-off mechanism is provided for severing the sisal padding where the springs are omitted, thus forming completely finished spring unit structures of desired size, progressively and automatically.

*Drive mechanism*

Figures 1, 2:
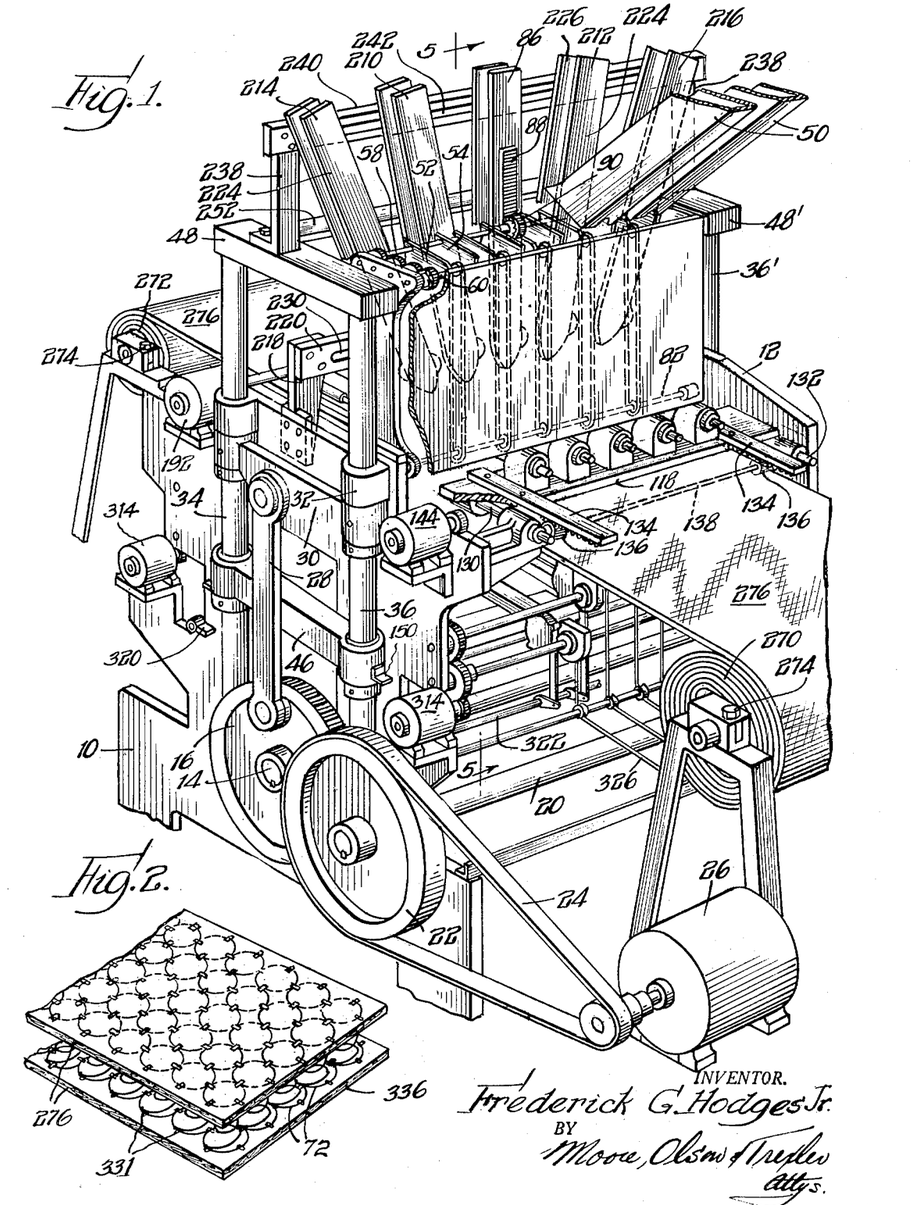
Fig. 1 is a general assembly perspective view of a spring unit manufacturing machine constructed in accordance with and embodying the principles of the present invention, certain of the parts being broken away for illustrative purposes.
Fig. 2 is a perspective view of a spring unit structure, as constructed by the machine.
Figures 3, 4:
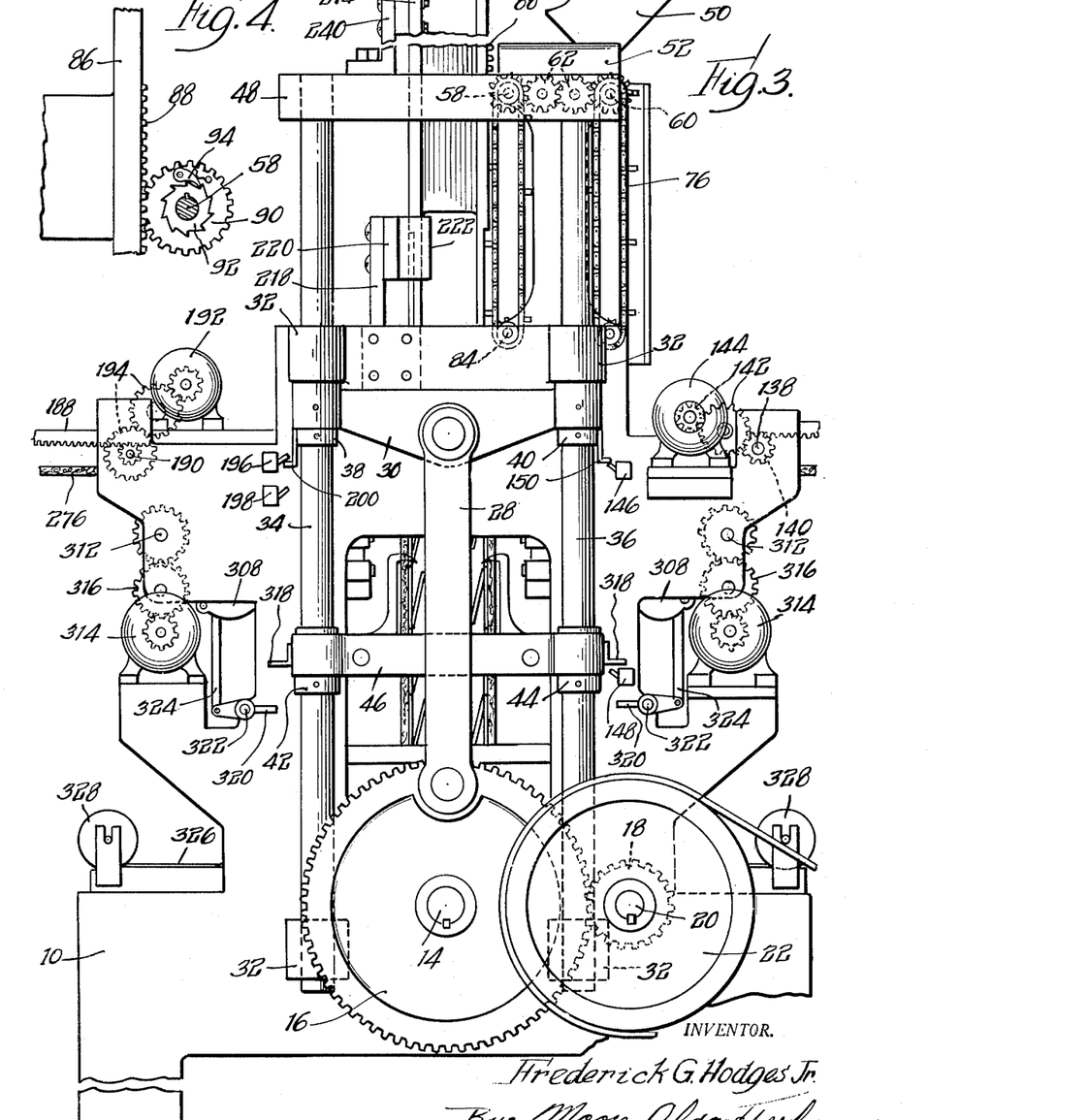
Fig. 3 is a side elevation of the machine shown in Fig. 1, looking from the left side thereof.
Fig. 4 is a detail view of a portion of the spring feeding mechanism.
Figures 5, 6:
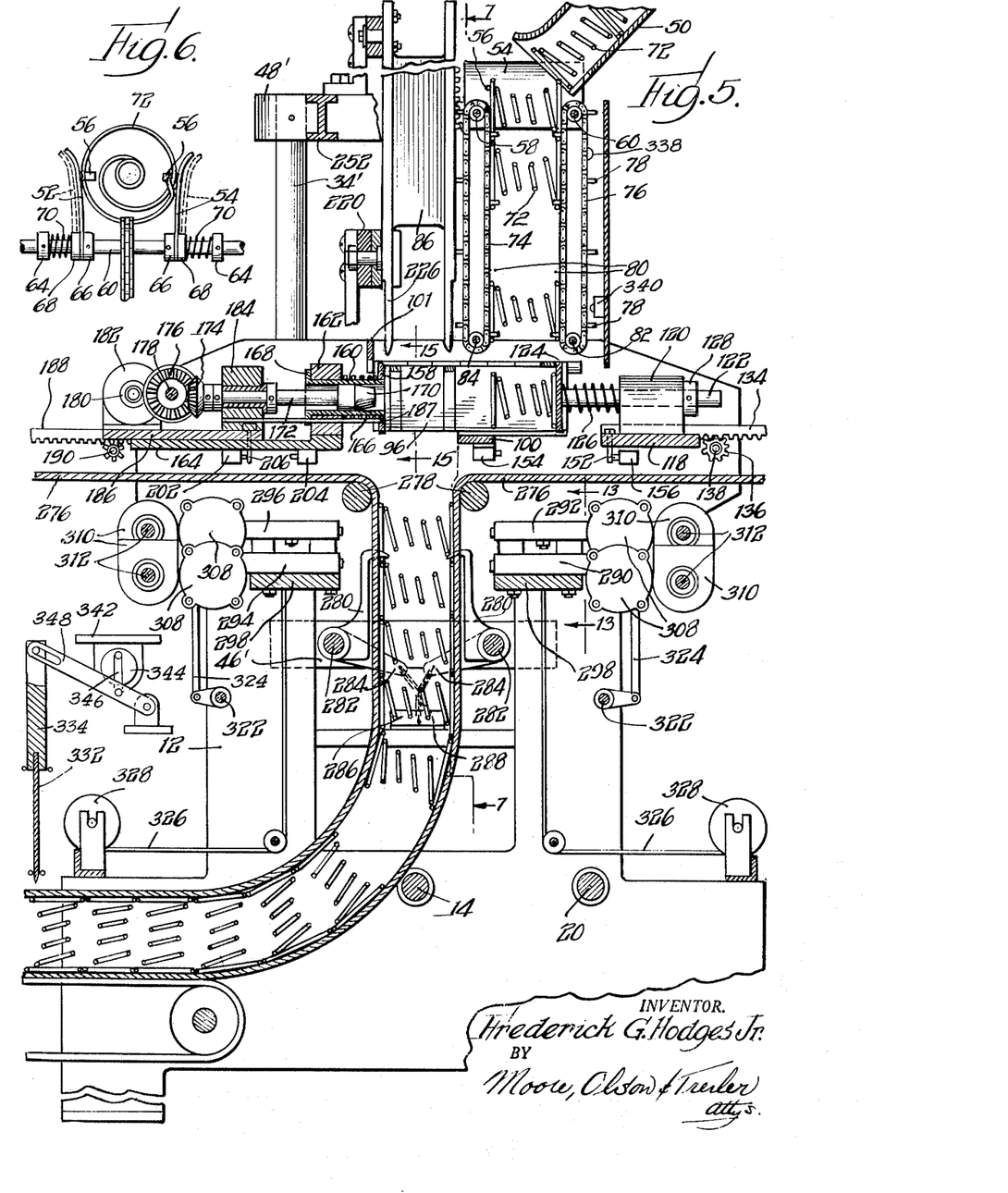
Fig. 5 is a vertical sectional view through the machine, taken substantially as indicated by the line 5—5 of Fig. 1.
Fig. 6 is a detail view of one of the loading platforms for receiving the springs from the supply hoppers or troughs.

Referring more specifically to the drawings, and first to Figs. 1, 3 and 5, the machine in general comprises a pair of side plates 10 and 12 forming the principal frame structure. A shaft 14 is journalled in the side plates, the shaft having gears 16 secured to the opposite ends thereof, one of which is shown in Figs. 1 and 3. Gears 16 are in mesh with and adapted to be driven by a pair of pinions 18 secured to the opposite ends of a countershaft 20 extending between the side frames, the arrangement being such that the gears 16 are rotated as a unit, proportional to the countershaft movement. The end of the countershaft adjacent the frame plate 10 has fixed thereto a drive pulley 22 adapted to be driven by means of a belt 24 powered from an electric motor 26, or other suitable power supply.

Each of the gears 16 is pivotally connected to the lower end of a connecting rod or link 28, Figs. 1 and 3, the upper end of which is pivotally connected to a vertically reciprocable cross head 30 pinned at its ends to a pair of rods operable within suitable bearings 32 carried by the side frame plates. As will be understood, the cross head and rod structures are duplicated on each side of the machine, the rods adjacent the frame plate 10 being indicated by the reference numerals 34 and 36, and the rods adjacent the frame plate 12 being indicated at 34′ and 36′, Figs. 1, 3 and 5.

Referring further specifically to rods 34 and 36, it will be seen that these rods have pinned thereto a pair of upper collars 38 and 40 and a pair of lower collars 42 and 44. These collars are adapted to effect the actuation of a cross head 46 which loosely embraces the rods and which is adapted to be engaged and moved downwardly by the collars 38 and 40 as the rods are moved to their lowermost position, and to be engaged and moved upwardly by the collars 42 and 44 as the rods are moved to their uppermost extent of travel, for a purpose subsequently to be described. This collar and floating cross head arrangement is provided in duplicate on opposite sides of the machine.

The rods at their upper ends carry a pair of cross bars 48 and 48′, Fig. 1, forming the timing and actuating structures for the shuttles, as will be later described.

It will be seen that by reason of the connections provided, upon rotation of the gears 16 reciprocation is imparted to the cross heads 30 and the connected rods 34—36 and 34′—36′, the floating cross heads 46—46′ being moved with the rods during the terminal portions of their movements, as set forth.

*Spring feeding mechanism*

Referring further to Figs. 1, 3 and 5, the particular machine disclosed is adapted to effect the manufacture of spring units having five springs in horizontal alignment.

To this end five feeding hoppers 50 are provided, one for each of the five shuttle mechanisms of the machine, two of the hoppers being shown in Fig. 1. The springs are adapted to be fed downwardly through the chutes or hoppers 50 in longitudinal abutting relation, Fig. 5, by any suitable means. As the springs gravitate down the chutes they become supported with their axes horizontal between a pair of support plates 52 and 54, a pair of such plates being provided for each of the chutes. The plates are provided with suitable pins 56, Figs. 5 and 6, for positioning the springs in proper horizontal disposition.

The plates are carried by a pair of shafts 58 and 60 journalled at their ends in the side frames, the shafts being interconnected adjacent the side frame 10 by suitable gearing 62. As best shown in Fig. 6, the support plates 52 and 54 are loosely journalled on the shafts, so as to permit the free rotation thereof, the plates being at the same time mounted for movement relatively toward and away from each other so as to permit the supported springs to be pulled downwardly therebetween. More specifically, suitable collars as indicated at 64 and 66, Fig. 6, are pinned to the shafts in suitable spaced relation, the support plates being urged against the collars 66 by means of the loosely mounted collars 68 and associated compression springs 70 bearing between such collars and the pinned collars 64. By reason of this arrangement as the coil springs, indicated by the reference numeral 72, are drawn downwardly between the suport plates, by means presently to be described, the plates may be separated slightly against the action of springs 70, moving from their full line to their dotted line positions, as indicated in Fig. 6.

To effect the pulling of the springs downwardly between the support plates, a pair of endless chains 74 and 76 are provided carrying pins 78 thereon at predetermined spaced intervals, which pins are adapted to engage the end coils of the springs and pull them down sequentially, from between the support plates. In the particular embodiment disclosed there are seven such pins in predetermined spaced relation, with one pin being omitted as indicated at 80, whereby to effect the feeding of seven springs in sequence, and then omit the feeding of the springs, thus providing spring units having a seven spring length.

The chains 76 are mounted between sprockets fixed to shaft 60 and a series of sprockets carried by a countershaft 82 extending between the side frames. Similarly the chains 74 are carried between sprockets fixed to shaft 58 and sprockets fixed to a countershaft 84 extending between and journalled in the side frames.

To effect the rotation of shafts 58 and 60, whereby to operate the chains, the center shuttle 86 carries on its forward face a rack 88, Figs. 1 and 4, which rack is engageable with a gear 90 loosely journalled on shaft 58. A ratchet wheel 92 is fixed to the shaft, this ratchet wheel being engaged by a pawl 94 carried by the gear. The arrangement is such that as the shuttle 86 and rack 88 are raised rotation is imparted to the shaft 58 through the intermediary of the pawl and ratchet, whereas when the shuttle and rack are lowered the pawl slips idly over the ratchet and the shaft 58 remains stationary. As previously pointed out, shafts 58 and 60 are interconnected by means of gears 62 for simultaneous rotation, so as to impart simultaneous and synchronized movement to the chains 74 and 76.

It will be seen that by reason of the connections provided, each time the shuttle 86 is raised, as will be presently described, a predetermined increment of movement is imparted to the chains 74 and 76, whereby to effect the downward feeding of the springs 72 from the support plates 52 and 54, one spring being dropped from the lower ends of the chains on each movement thereof, except as the space 80 where no spring gripping pin 78 is provided. The springs are slightly compressed between the chains, so as to be firmly held thereby.

Spring positioning mechanism

As the springs 72 drop from between the lower ends of the chains, they fall between pairs of plates 96 and 98 forming trough-like support structures for the springs, one pair of such plates being provided for each of the five shuttle mechanisms of the machine. These plates are perhaps best shown in the perspective view, Fig. 23, and also Figs. 24, 5 and 15.

Figures 22, 23, 24, 25:
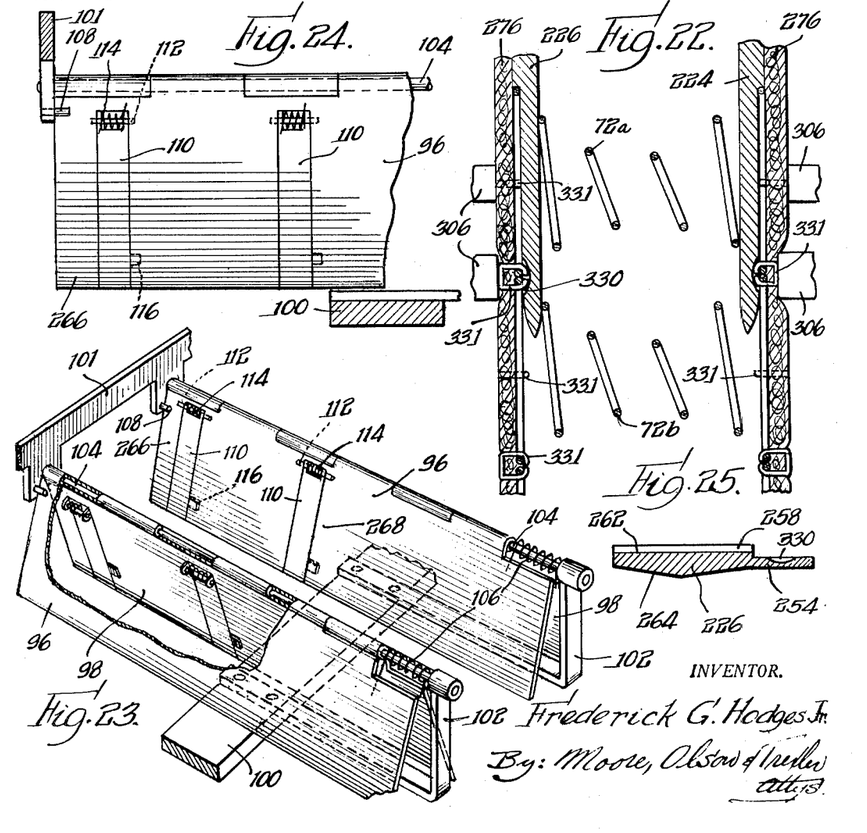
Fig. 23 is an enlarged perspective detail view of one of the support trough structures for the springs, cooperable with the shuttles.
Fig. 24 is a partial longitudinal view of one of the trough plates of Fig. 23.
Fig. 25 is a cross sectional view through one of the shuttle plates, on the line 25—25 of Fig. 9.

The pairs of trough plates 96 and 98 are supported by means of frame bars 100 and 101, Figs. 5 and 23, extending across the machine between the frame side plates. More specifically, and as best shown in Fig. 23, the bar 100 carries a series of brackets 102, these brackets and the bar or plate 101 cooperating to support a series of shafts 104, upon which the plates are pivotally mounted. Torsion springs as indicated at 106 urge the plate pairs relatively toward each other, their movement relatively together being limited by stop pins 108 carried by the bar 101. Each plate also carries a pair of trap doors 110, the doors being pivotally mounted in respect to the plate on which they are carried at their upper ends by means of pivot pins 112. Each pivot pin has a torsion spring 114 associated therewith in such a manner as to urge the trap doors toward each other, the doors, however, being limited in their movements and held in a position flush with the plates by stop lugs 116 individually carried thereby. As will be understood, these stop lugs, carried by the doors, engage the rear faces of the plates to limit the movements of the doors under the urging action of the springs. The springs 114 are relatively weaker than the springs 106. Accordingly it will be seen that the trap doors 110 may be moved relatively apart, by the application of force thereto, and as will presently be described, without corresponding movement of the plates 96 and 98.

Figure 15:
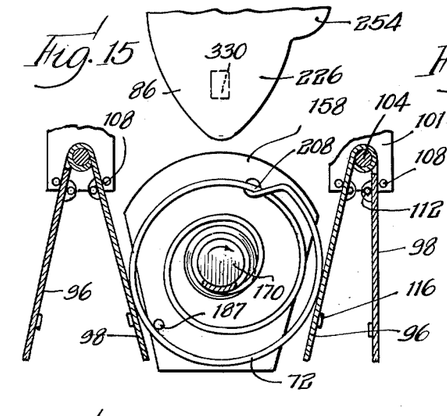
Fig. 15 is an enlarged detail view taken substantially as indicated by the line 15—15 of Fig. 5, and illustrating one of the spring indexing mechanisms.

When the plates are in their normal position, as shown in Figs. 15 and 23, their position is such that they support the springs 72 therebetween, with their axes horizontally disposed.

A shiftable platform 118, Fig. 5, extends across the machine between the frame side plates, this platform carrying a series of brackets 120, one for each of the spring trough supports. Each bracket carries a plunger 122 longitudinally reciprocable therein, the front end of which has a head 124 shaped to slide between its associated trough plates 96 and 98 but so as to engage the end of a spring 72 carried therebetween. A compression spring 126 bearing between the bracket 120 and the plunger head 124 normally holds the plunger extended, as shown in Fig. 5, with a collar 128 pinned to the plunger in abutting engagement against the bracket 120.

The platform 118 is guided for movement axially of the troughs by a pair of guide rods 130 and 132, Fig. 1, forming a part of the machine frame structure. To effect the movement of the platform a pair of rack bars 134, Figs. 1 and 5, is provided, these rack bars being engageable with pinions 136 fixed to a shaft 138 extending across the machine between the frame side plates. At its end adjacent the side plate 10, shaft 138 carries a gear 140, Fig. 3, which, by means of suitable gearing as indicated at 142, is adapted to be driven by a reversible electric motor 144. The arrangement is such that as the motor is operated the platform 118 will be propelled in one direction or the other axially of the spring support troughs between suitable limits.

To control the energization of motor 144 there is provided a pair of limit switches 146 and 148, Fig. 3, adapted for actuation by a bracket 150 carried by the collar 40. The arrangement is such that when the rod 36 has almost reached the uppermost position limit switch 146 is actuated so as to propel the platform 118 forwardly or to the left, as seen in Fig. 5, the movement of the platform being limited by the engagement of a pin 152 carried thereby with a limit switch 154. After the rod 36 has moved downwardly through the major portion of its stroke of travel, limit switch 148 is actuated so as to energize motor 144 to return the platform 118 rearwardly or to the right as seen in Fig. 5, the return movement being limited by the engagement of pin 152 with a limit switch 156.

It will be seen that by reason of the mechanism provided, upon each cycle of operation of the machine the platform 118 will be shifted forwardly and then returned, so as to project the springs dropped into the support troughs from the chains forwardly or to the left to a position beneath the shuttles presently to be described.

Spring indexing mechanism

As the springs 72 are projected forwardly or to the left, Fig. 5, by the plunger heads 124, they are brought into engagement with and stopped by a series of stop plates 158, there being one such stop plate provided for each of the trough support structures. The shaping of the stop plates is perhaps best shown in Fig. 15, the plates being shaped to fit between plates 96—98 and engage the springs. These plates are carried on the ends of sleeves 160, Fig. 5, reciprocably mounted within brackets 162 carried by a frame support plate 164 extending across the machine and forming a part of the machine frame structure. Compression springs 166 normally hold the stop plates 158 in their forwardly projected positions, as shown in Fig. 5, with the flanges 168 of the sleeves 160 in engagement with brackets 162. Springs 166 are stronger than springs 126. The stiffness of the springs 72 is also greater than that of the springs 126 so that as the springs 72 are brought into engagement with the stop plates 158 springs 126 will yield so as to hold the coil springs 72 between the plunger heads 124 and stop plates 158 and within the support troughs, under very slight compression.

A rotatable indexing cone 170, Fig. 5, is arranged to be projected through each of the sleeves, the cones being secured to the forward ends of shafts 172, the rear ends of which carry bevel gears 174 in engagement with bevel gears 176 carried at appropriately spaced intervals by a cross shaft 178 driven by gearing 180 from a constantly operating electric motor 182. The shafts 172 are journalled for rotation within a series of brackets 184. Brackets 184, the electric motor 182, and the associated gearing connections including the shafts 172 and the cones 170 are all carried by a shiftable support platform 186 movable in a direction axially of the support troughs. As shown in Fig. 5, motor 182 is suitably carried at one end of platform 186, adjacent the frame side plate 12. Also fixed to and extending from each bracket 184 is a fixed indexing pin 187 cooperable with its associated rotatable indexing cone 170 in a manner as will be presently described. The shiftable platform 186 is adapted to be actuated by means of racks 188, and driving pinions mounted on a cross shaft 190, in a manner similar to the rack and pinion drive means 134—136 provided for the shiftable platform 118 previously described. The pinion shaft 190 is powered from a reversible electric motor 192, Figs. 1 and 3, carried by the frame plate 10 and arranged to drive the pinion shaft through suitable gearing connections as indicated at 194.

The energization of motor 192 is controlled by a pair of limit switches 196 and 198, Fig. 3, adapted for actuation by a bracket 200 carried by the collar 38; and by a pair of limit switches 202 and 204, Fig. 5, adapted for actuation by a pin 206 depending from the shiftable platform 186.

In operation, actuation of the limit switch 146, as previously described, projects the shiftable platform 118 forwardly so as to shift the springs 74 supported between the sets of trough plates 96 and 98 axially thereof, to the left as seen in Fig. 5. The extent of movement of platform 118 is such that the springs 74 are brought into very slight compression between the stop plates 158 and the plunger heads 124, with springs 126 slightly compressed, as also previously described.

Figure 16:
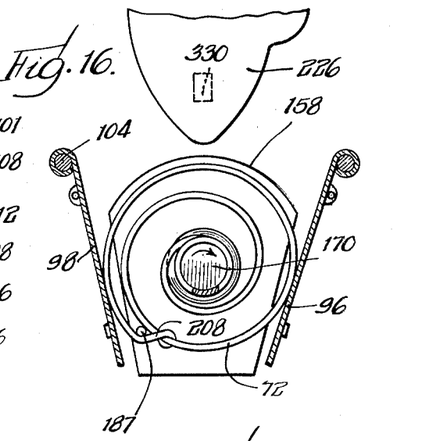
Figs. 16, 17 and 18 are views generally similar to Fig. 15, showing successive steps in the operation of the parts.

After movement of platform 118 has been arrested, and substantially as the rods 34 and 36 reach their uppermost position, bracket 200 operates limit switch 196, Fig. 3, causing the energization of motor 192 to project the movable indexing cone platform 186 forwardly or to the right as seen in Fig. 5. As has been previously pointed out, the cones 170 are constantly rotated by means of the motor 182. As the cones engage the coils of the coil springs, Fig. 20, rotation is imparted thereto in the direction of the arrows, Figs. 15 and 16, the springs being rotated to bring their knot or tie portions 208 into engagement with the fixed indexing pins 187, whereby to align the knot portions of all of the springs in predetermined radial alignment. The purpose of this indexing is to facilitate operation of the shuttles and stapling mechanisms presently to be described. As will be understood, the limit switch 204 controls the extent of movement of the indexing cone platform 186 so as to bring the cones properly into engagement with the coil springs.

After the coil springs have been indexed, and after the bars 34 and 36 have been moved downwardly a very short distance, bracket 200 operates limit switch 198, Fig. 3, energizing motor 192 to retract the indexing cones and pins to their normal position, as seen in Fig. 5, the extent of the return movement being controlled by limit switch 202, as will be understood.

The coil springs 72 are thus now individually disposed within the support troughs, in properly indexed position, and under very slight compression between the plunger heads 124 and the stop plates 158.

Shuttle structures

In the particular embodiment disclosed there are five shuttle structures 86, 210, 212, 214 and 216, Fig. 1, corresponding to the five lateral banks of the machine. The central shuttle 86 is vertically disposed, whereas the remaining shuttles displaced from the center shuttle have progressive lateral angularity, as shown. Means is provided for shifting the shuttles longitudinally on their respective individual axes, in accordance with the movements of the bars 34—36.

More particularly, referring to Figs. 1 and 7–12, each of the frame side plates 10 and 12 carries an upstanding bracket 218, one of which is illustrated in Fig. 1, between which extends a cross bar 220. The cross bar 220 carries a series of five guide brackets 222, one for each shuttle. Each of the guide brackets and shuttle connections is similar, the guide bracket for the central shuttle 86 being shown in detail in Figs. 9, 10 and 12.

The shuttles are all similarly formed and each comprises a front plate 224 and a rear plate 226 connected by means of a web 228. The rear plate 226 has a sliding fit with its guide bracket 222, as perhaps best indicated in Fig. 12. The cross bar 220 is provided with a longitudinal slot 230, each guide bracket being connected in the slot by means of a stud 232. Each stud has a head 234 rotatably connected with the guide bracket and is arranged to receive a clamping nut 236 at its opposite end. Upon tightening of the nuts 236 the guide brackets will be securely clamped in position and fixed to the cross bar 220. Prior to tightening the nuts, the guide brackets may be longitudinally and rotatably adjusted so as to properly align and position the shuttles.

Figures 9, 10, 11, 12:
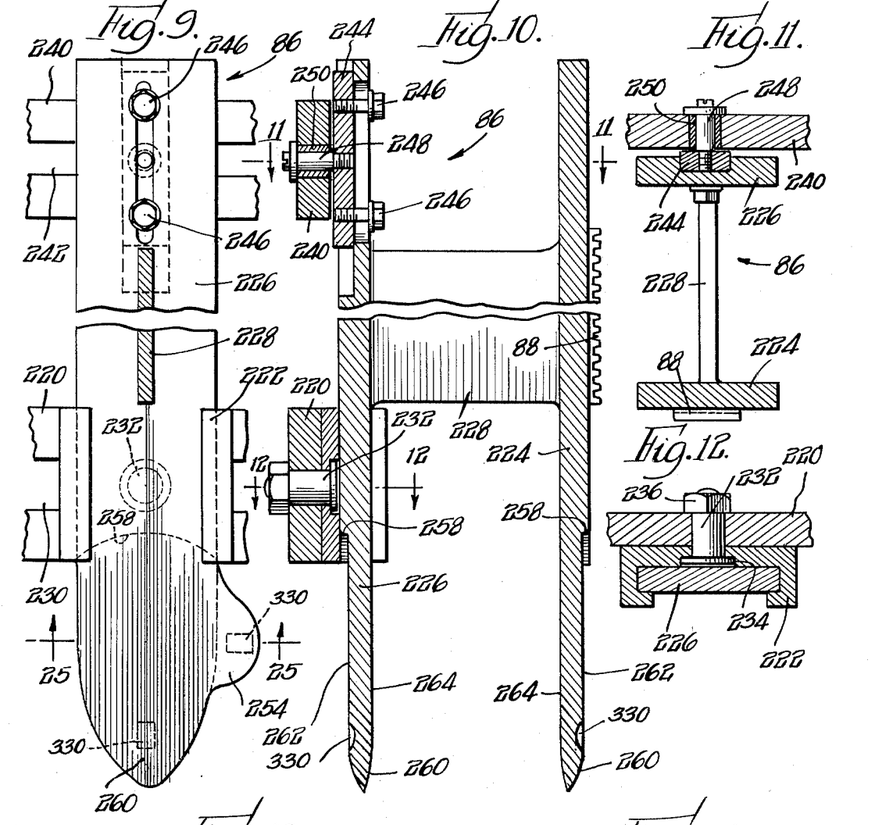
Fig. 9 is an enlarged detail view of one of the shuttles.
Fig. 10 is a side view of the shuttle shown in Fig. 9.
Figs. 11 and 12 are sectional views through the shuttle structure of Fig. 10, on the lines 11—11 and 12—12 respectively.

To effect the reciprocation of the shuttles, each of the cross bars 48 and 48', Fig. 1, is provided with an upstanding bracket 238 interconnected at their ends by means of a shuttle operating cross bar 240 also provided with a slot as indicated at 242 extending along its length. As best shown in Figs. 9, 10 and 11, each of the shuttle rear plates 226 is fitted with a slide 244 arranged to be adjustably clamped to the shuttle plate by bolts or screws 246. The slide 244 carries a screw 248 embraced by a bushing as indicated at 250, the bushing being loosely engaged within the operating bar slot 242.

It will be seen that by reason of the connections provided, as the operating bar 240 is reciprocated upwardly and downwardly with the rods 34—36, all of the shuttles will be correspondingly moved along their individual longitudinal axes as determined by the positioning of the guide brackets 222. The adjustability of the slides 244 relative to the shuttles, facilitates adjustment in the set-up of the machine.

To further rigidify the structure, the cross bars 48 and 48' are preferably interconnected by an I-beam 252, Figs. 1 and 5.

Shuttle operation, sisal padding, and stapling mechanisms

Figure 7:
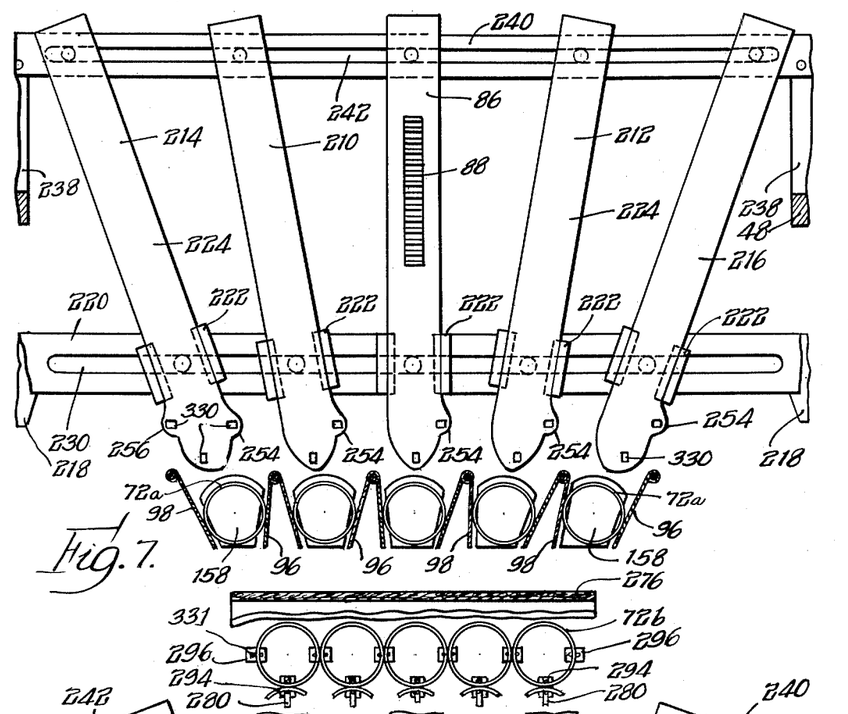
Fig. 7 is a partial transverse sectional view through the machine, taken as indicated by the line 7—7 of Fig. 5, and more particularly illustrating the shuttle mechanisms and associated parts.

The front and rear plates of each of the shuttles are provided with laterally extending ears 254, Fig. 7, the front and rear plates of the shuttle 214 both being provided with a second set of ears as indicated at 256. The shuttle front and rear plates are also provided on their outer faces with recessed portions terminating at their upper ends in arcuate shoulders as indicated at 258, Figs. 9 and 10, shaped to conform to the contour of the end convolutions of the coil springs 72. The shuttle plates are further provided at their lower ends with sharpened portions 260. As best shown in Fig. 25, the shuttle plate surfaces 262 are flat whereas the inner surfaces 264 are preferably slightly V-shaped transversely of the shuttle plate. It will be seen that the lower ends of the shuttle plates in effect form prongs or tines adapted to engage and impale the springs.

Figures 20, 21:
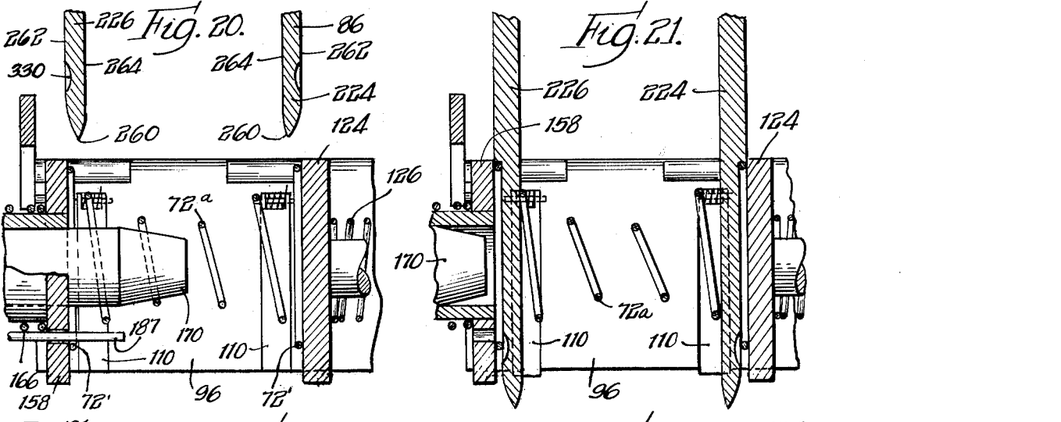
Fig. 20 is a side view of the structure shown in Fig. 15.
Figs. 21 and 22 are generally similar views, but illustrating successive positions of the parts.

The spacing of the sharpened shuttle ends 260 is such that as the shuttles descend, Figs. 20 and 21, the flat end convolutions 72' of the coil springs 72 are caused to be cammed onto the outer faces 262 of the shuttle plates, causing the coil springs to be moved from a state of slight compression into a state of slight elongation or tension. During this time, and prior to the engagement of the end convolutions against the shoulders 258, the coil springs are held against downward movement by the trough plates 96—98, the spring end coils resting substantially upon the plate surfaces indicated by the numerals 266 and 268, Fig. 23, lying immediately outwardly of the trap doors 110.

Figures 17, 18, 19:
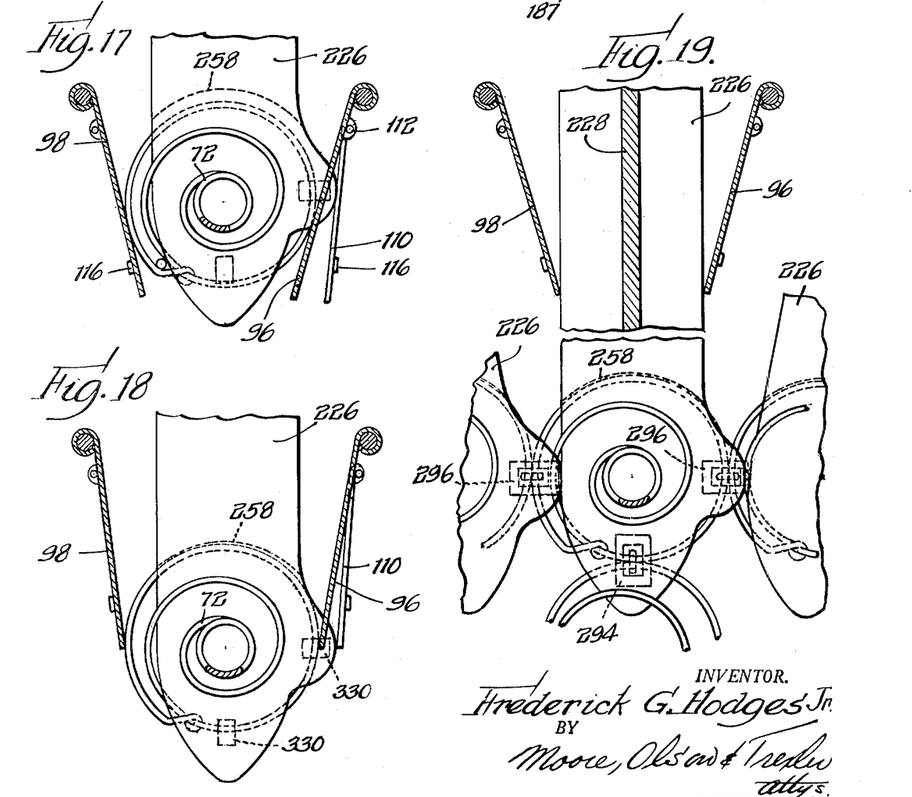
Fig. 19 is a similar view, also illustrating the stapling mechanisms, and showing the shuttle in completely lowered position.
Figures 26, 27:
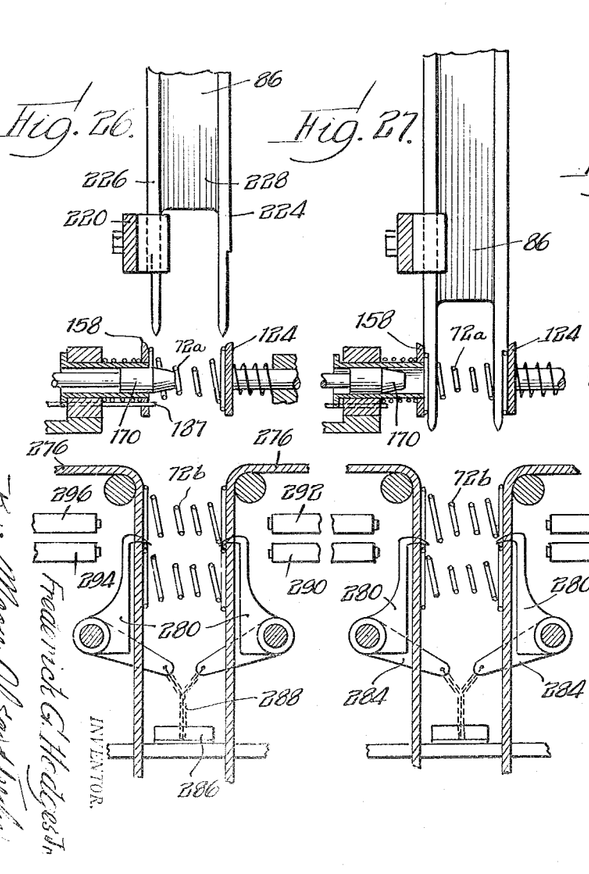
Figs. 26—29 are illustrative views showing successive steps of one of the shuttle mechanisms, and associated parts, in the operation of the machine.
Figure 28:
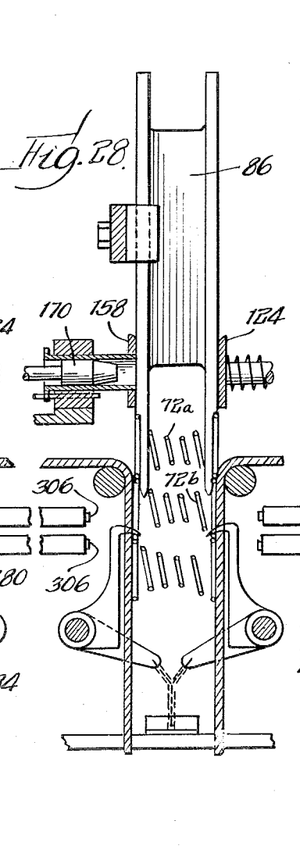

As the shuttles descend, the springs 166 and 126 associated, respectively, with the stop plates 158 and the plunger heads 124 are compressed slightly, as indicated in Figs. 26 and 27 to permit the aforesaid elongation of the coil springs. This elongation stresses the coil springs sufficiently so that they will not drop from the shuttles during their downward movement. The ears 254—256 of the shuttles are vertically aligned with the trap doors 110 of the trough support plates 96—98, so that as the shuttles descend these ears effect the opening of the doors, as indicated in Fig. 17, without movement of the plates 96—98, until the spring coils are seated against the shuttle shoulders 258 whereupon the plates 96—98 are forced apart as shown in Fig. 18, the springs descending with the shuttles.

A pair of supply rolls 270 and 272, Fig. 1, of sisal padding or other suitable sheet material are provided, the rolls being provided with suitable friction mechanism as indicated at 274. The sheet sisal material 276 extends from the rolls over a pair of guide rollers 278, Fig. 5, and thence downwardly in spaced parallel relation so that the springs can be inserted by the shuttles therebetween.

Figure 8:
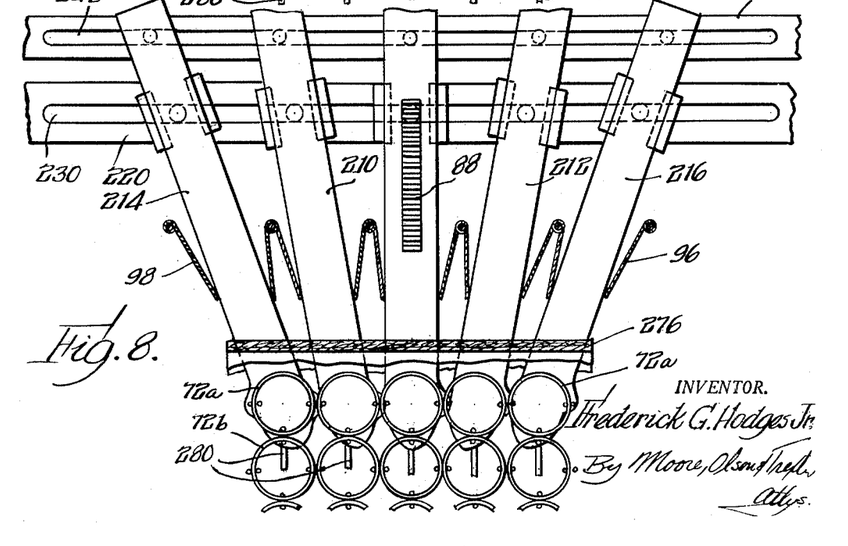
Fig. 8 is a view similar to Fig. 7 but showing the shuttles in lowered position.

To effect movement of the sisal, five pairs of hooks 280, Figs. 5 and 8, are provided, these hooks being mounted at spaced intervals upon a pair of rock shafts 282 pivoted in the floating cross heads 46 and 46', and extending transversely across the machine. At their ends adjacent the frame plate 12 these rock shafts have fixed thereon a pair of arms 284 arranged on lowering movement of the floating cross heads to be engaged by a frame abutment block 286, and on upward movement of the floating cross heads to be pulled downwardly by a chain 288 connected between the arms and said frame block.

It will be seen, referring particularly to Figs. 26–29, that as the floating cross heads reach their lowermost extent of travel the hooks are withdrawn from the sisal, and as the floating cross heads reach their uppermost extent of travel the hooks are engaged with the sisal, as shown. The gripping portions of the hooks are of sufficient length so that they extend through the sisal for contact and cooperation with the end convolutions of the coil springs.

While the hooks have been shown in line with the stapling heads, presently to be described, for cooperation with the spring coils; the hooks may if desired be mounted laterally between the heads, being engageable with only the sisal to effect their movement operations.

Figure 13:
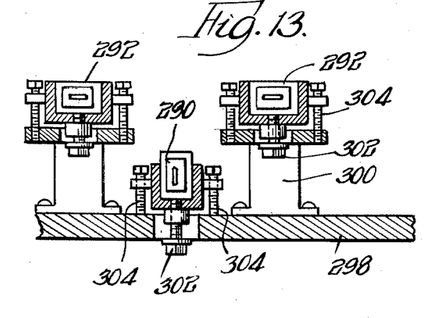
Fig. 13 is a partial detail view of the stapling heads and the mounting means therefor, the view being taken substantially as indicated by the line 13—13 of Fig. 5.
Figure 14:
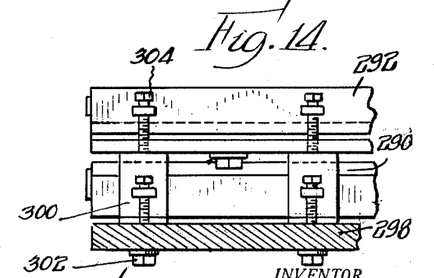
Fig. 14 is a side view of the structures of Fig. 13.

Two sets of stapling heads 290—292 and 294—296, Figs. 5 and 7, are provided for action upon the opposite ends of the springs. As best shown in Fig. 13, the stapling heads are mounted upon frame cross bars 298 extending transversely of the machine between the frame side plates. The heads 292 and 296 are mounted upon pedestals 300, Fig. 13, so that they form aligned rows somewhat above the heads 290 and 294. The heads are mounted for lateral adjustment by means of a series of adjustment screws 302 shiftable in lateral slots within the support structures; and for vertical adjustment by means of adjustment screws as indicated at 304.

Figure 29:
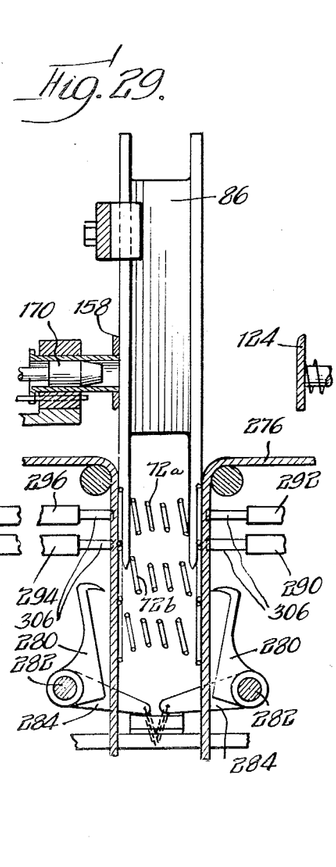

As best shown in Fig. 29, the heads are provided with extensible stapling plungers 306 containing the stapling mechanisms, extensible from the heads into engagement with the sisal padding by means of single operation clutches 308, Fig. 5, powered by cam mechanisms 310. As will be understood, one clutch and cam is provided for each of the stapling heads. The cams are driven by means of drive shafts 312 powered from a pair of constantly operable drive motors 314 mounted on the frame plate 10, Fig. 3, through the intermediary of suitable gearing as indicated at 316. The arrangement is such that the stapling plungers are projected to effect one stapling operation upon each actuation of the clutches 308.

Means is provided for operating the clutches in timed relation with the shifting of the floating cross heads 46—46'. More specifically, referring to Fig. 3, the cross head 46 carries a pair of brackets 318 engageable with levers 320 secured to a pair of rock shafts 322 extending transversely of the machine between the frame side plates. Each of the rock shafts is provided with a plurality of link connections 324, one for each stapler, arranged to actuate the clutches 308 as the levers 320 are engaged as the floating cross heads 46—46' reach their lowermost limit of travel. Stapling wire 326, Fig. 5, is transmitted to the stapling devices from a series of supply spools 328, one spool being provided for each of the stapling mechanisms.

In operation, as the coil springs 72 are engaged by the shuttles, they are moved downwardly and convergently toward each other as indicated in Figs. 7 and 8. As each row of springs, for example as indicated at 72a in Figs. 26–29, is moved downwardly it reaches a position shown in Fig. 28 wherein the springs are brought substantially into abutting engagement with the row of springs 72b previously operated upon and stapled into position. The positioning of the collars 38 and 40, Fig. 3, is such that the floating cross heads 46—46' are engaged at this time, so that upon continued downward movement of the shuttles the hooks 280, the sisal padding and all of the springs are moved downwardly simultaneously, ultimately arriving as the bars 34 and 36 reach their lowermost extent of travel, into the position shown in Fig. 29. In this position the springs and stapling heads are aligned as indicated in Fig. 8, so that as the stapling plungers are projected and the stapling operations effected, the springs are stapled to each other and to the sisal padding both horizontally and vertically to form a completely interconnected structure. The shuttle plates are provided with arcuate recesses 330, Figs. 7, 15 and 22, which are brought into alignment with the stapling heads as the shuttles reach their lowermost position, such recesses acting as anvils cooperable with the stapling mechanisms to effect the stapling operations, as best shown in Fig. 22. It will be seen that the staples, as indicated at 331, pass through the sisal padding and around the juxtaposed spring coils, securing the springs to each other and to the sisal padding. As indicated in Fig. 25, the anvil surface may be spaced slightly back of the plane of the end convolutions of the springs, but such spacing is readily accommodated by the flexing of the spring wire.

The manner in whch the springs are stapled together is also shown in Fig. 19.

Severing means

In accordance with the invention, as previously set forth, means is provided for omitting the feeding of the springs at predetermined intervals, every eighth spring being omitted in the particular embodiment disclosed.

Means is provided for severing the sisal padding where the spring is omitted, whereby to provide individual spring unit structures.

Such severing means may comprise a vibratory reciprocable knife as indicated at 332, Fig. 5, secured to a suitable knife holder 334. Operating means may be provided for the knife support to effect its continuous vibration and vertical reciprocation to effect the severing operations in timed relation with the spring feeding and securing means. More particularly, as diagrammatically shown in Fig. 5, chain 76 may be provided at one point thereon with an abutment member 338 adapted to operate a switch 340 suitably carried by the frame of the machine. This switch controls a motor 342 having a rotary operator 344 arranged by means of suitable links 346 and 348 to reciprocate the knife holder 334 one reciprocation upon each operation of the switch 340, so that the knife will cut the completed units at the point where the feeding of the springs has been omitted.

One of the completed spring unit structures is shown in Fig. 2, with the line of severance being indicated at 336.

Operation

The operation of the machine has been heretofore described in connection with the description of the several mechanisms.

In summary it may be pointed out that the coil springs 72 are fed to the inclined hoppers or chutes 50, Fig. 1, by any suitable means, down which they gravitate into position between the support plates or troughs 52—54. The endless chains 74—76, Fig. 5, intermittently operated upon the upward movement of the shuttles, draw the coil springs downwardly between plates 52—54 and drop them into the several support troughs formed by the plates 96—98, Fig. 23.

Immediately after a set of springs has been thus dropped, the movable platform 118, Fig. 5, is projected forwardly or to the left, as seen in Fig. 5, so as to bring the coil springs 72 into engagement with the stop plates 158. The constantly rotatable indexing cones 170 then advance to the right into engagement with the springs, and effect the angular indexing thereof, to a position determined by the index stop pins 187.

The shuttles then descend, impaling the coil springs and forcing them downwardly between the trough plates 96—98. As the springs are moved downwardly to the position indicated in Fig. 28 (in juxtaposition to the previously assembled line of springs, if such line of springs is present), the floating cross heads 46—46' are engaged so that the line of springs 72a being operated upon, the previous line of spring 72b, and the sisal padding are all moved downwardly as a unit from the position shown in Fig. 28 to a position as indicated in Fig.

29. The hooks 280, which are engaged with the sisal padding as the auxiliary cross heads were raised, are automatically disconnected therefrom, as shown in full lines, as the parts reach their Fig. 29 position. It will be noted that these hooks not only engage the sisal padding but also, in the arrangement shown, engage the spring coils and thus aid in the moving and positioning thereof.

The several stapling heads are thereupon projected as shown in Fig. 29, to effect the stapling operations. As will be understood, the heads and the stapling plungers when in retracted position are sufficiently withdrawn so that they do not interfere with the movement of the hooks 280. If the hooks are placed laterally between the heads, it is unnecessary for the heads and plungers to be retracted as great a distance.

It will be seen that in accordance with the invention means and methods are provided for automatically and progressively forming the spring unit structures; the springs being secured to each other and to the sisal padding both longitudinally and transversely, forming a closely knit and durable spring unit structure.

It is obvious that various changes may be made in the specific embodiment set forth without departing from the spirit of the invention. The invention is accordingly not to be limited to the specific embodiment shown and described, but only as indicated in the following claims.

The invention is hereby claimed as follows:

1. Apparatus for making spring units for cushions or the like which comprises means for feeding coil springs into predetermined juxtaposition relative to each other to form a predetermined spring pattern with the axes of the springs in parallel relation, and means for progressively securing the springs together both longitudinally and transversely to form a spring unit structure.

2. Apparatus for making spring units for cushions or the like which comprises means for feeding transversely aligned sets of coil springs into predetermined longitudinal juxtaposition relative to each other with the axes of the springs in parallel relation, and means for progressively securing the end convolutions of the springs together both longitudinally and transversely to form a spring unit structure.

3. Apparatus for making spring units for cushions or the like which comprises means for feeding coil springs into predetermined juxtaposition relative to each other to form a predetermined spring pattern with the axes of the springs in parallel relation, and means for progressively stapling the end convolutions of the springs together both longitudinally and transversely to form a spring unit structure.

4. Apparatus for making spring units for cushions or the like which comprises means for feeding coil springs into predetermined juxtaposition relative to each other to form a predetermined spring pattern with the axes of the springs in parallel relation, means for feeding elongated sheet material into engagement with the ends of the springs, and means for progressively securing the end convolutions of the springs to each other and to the sheet material both longitudinally and transversely to form a spring unit structure.

5. Apparatus for making spring units for cushions or the like which comprises means for feeding coil springs into predetermined juxtaposition relative to each other to form a predetermined spring pattern with the axes of the springs in parallel relation, means for feeding elongated sheet material into engagement with the ends of the springs, and means for stapling the end convolutions of the springs to each other and to the sheet material both longitudinally and transversely to form a spring unit structure.

6. Apparatus for making spring units for cushions or the like which comprises means for feeding transversely aligned sets of coil springs into predetermined longitudinal juxtaposition relative to each other with the axes of the springs in parallel relation, means for feeding sheets of non-metallic fibrous material into engagement with the ends of the springs, and means for progressively stapling the end convolutions of the springs to each other and to the sheet material both longitudinally and transversely to form a spring unit structure.

7. Apparatus for making spring units for cushions or the like which comprises means for feeding coil springs into predetermined juxtaposition relative to each other with the axes of the springs in parallel relation, means for rotatably indexing the springs to bring the tie portions thereof into predetermined angular position, and means for securing the springs together longitudinally and transversely to form a spring unit structure.

8. Apparatus for making spring units for cushions or the like which comprises means for feeding coil springs into predetermined juxtaposition relative to each other with the axes of the springs in parallel relation, means for rotatably indexing the springs to bring the tie portions thereof into predetermined angular position, and means for stapling the end convolutions of the springs together longitudinally and transversely to form a spring unit structure.

9. Apparatus for making spring units for cushions or the like which comprises means for feeding coil springs into predetermined juxtaposition relative to each other with the axes of the springs in parallel relation, means for rotatably indexing the springs to arrange the tie portions thereof in predetermined angular position, means for feeding elongated sheet material into engagement with the ends of the springs, and means for securing the end convolutions of the springs to each other and to the sheet material longitudinally and transversely to form a spring unit structure.

10. Apparatus for making spring units for cushions or the like which comprises means for feeding coil springs into substantial abutment relative to each other both longitudinally and transversely with the axes of the springs in parallel relation, said feeding means including mechanism for feeding the springs in sets of predetermined number, and means for securing the springs together longitudinally and transversely to form a spring unit structure.

11. Apparatus for making spring units for cushions or the like which comprises means for feeding coil springs into substantial abutment relative to each other both longitudinally and transversely with the axes of the springs in parallel relation, said feeding means including mechanism for feeding the springs in sets of predetermined number, and means for progressively stapling the end convolutions of the springs together longitudinally and transversely to form a spring unit structure.

12. Apparatus for making spring units for cushions or the like which comprises means for feeding coil springs into substantial abutment relative to each other both longitudinally and transversely with the axes of the springs in parallel relation, said feeding means including mechanism for feeding the springs in sets of predetermined number, means for feeding sheets of non-metallic fibrous material into engagement with the ends of the springs, and means for progressively stapling the end convolutions of the springs to each other and to the sheet material longitudinally and transversely to form a spring unit structure.

13. Apparatus for making spring units for cushions or the like which comprises means for feeding coil springs into substantial abutment relative to each other both longitudinally and transversely with the axes of the springs in parallel relation, said feeding means including mechanism for feeding the springs in sets of predetermined number, means for feeding sheets of non-metallic fibrous material into engagement with the ends of the springs, means for securing the end convolutions of the springs to each other and to the sheet material longitudinally and transversely, and means for severing the sheet material at predetermined intervals to form a spring unit structure.

14. Apparatus for making spring units for cushions or the like which comprises means for successively feeding sets of springs into predetermined juxtaposition relative to each other, each of said sets comprising a plurality of coil springs having their axes in parallel relation, said feeding means including mechanism for feeding the sets of springs relatively toward each other and for feeding the springs within the sets relatively together.

15. Apparatus for making spring units for cushions or the like as defined in claim 14, wherein means is provided for rotatably indexing the springs to bring the tie portions thereof into predetermined angular position.

16. Apparatus for making spring units for cushions or the like which comprises means for successively feeding sets of springs into predetermined juxtaposition relative to each other, each of said sets comprising a plurality of coil springs having their axes in parallel relation, said feeding means including feeding members movable along convergent paths of travel for feeding the sets of springs relatively toward each other while simultaneously moving the springs of one of the sets together.

17. Apparatus for making spring units for cushions or the like which comprises means for successively feeding sets of springs into predetermined juxtaposition relative to each other, each of said sets comprising a plurality of coil springs having their axes in parallel relation, said feeding means comprising a series of shuttles reciprocable along convergent paths of travel, said shuttles being adapted to impale the springs and move the sets of springs relatively toward each other while moving the springs of one set together.

18. Apparatus for making spring units for cushions or the like which comprises means for assembling and successively feeding sets of springs into predetermined juxtaposition relative to each other, each of said sets comprising a plurality of coil springs having their axes in parallel relation, and a plurality of stapling devices for stapling the end convolutions of the springs together both longitudinally and transversely to form a spring unit structure.

19. Apparatus for making spring units for cushions or the like which comprises means for successively feeding sets of springs into predetermined juxtaposition relative to each other, each of said sets comprising a plurality of coil springs having their axes in parallel relation, said feeding means comprising a series of shuttles reciprocable along convergent paths of travel, said shuttles being adapted to impale the springs and move the sets of springs relatively toward each other while moving the springs of one set together, and a plurality of stapling devices cooperable with the shuttles as anvils to staple the springs together longitudinally and transversely to form a spring unit structure.

20. Apparatus for making spring units for cushions or the like which comprises means for successively feeding sets of springs into predetermined juxtaposition relative to each other, each of said sets comprising a plurality of coil springs having their axes in parallel relation, said feeding means including mechanism for feeding the sets of springs relatively toward each other and for feeding the springs within the sets relatively together, and means for progressively securing the springs together both longitudinally and transversely to form a spring unit structure.

21. Apparatus for making spring units as defined in claim 20, wherein the spring securing means comprises stapling mechanism for stapling the end convolutions of the springs.

22. Apparatus for making spring units for cushions or the like which comprises means for feeding coil springs into predetermined juxtaposition relative to each other to form a predetermined spring pattern with the axes of the springs in parallel relation and with the springs in transversely aligned sets, and means for progressively securing the springs together both longitudinally and transversely to form a spring unit structure, said means effecting the securing of all of the springs in each transverse set substantially simultaneously.

23. Apparatus for making spring units as defined in claim 22, wherein the spring securing means comprises stapling mechanism for stapling the end convolutions of the springs.

24. Apparatus for making spring units for cushions or the like which comprises means for feeding coil springs into predetermined juxtaposition relative to each other to form a predetermined spring pattern with the axes of the springs in parallel relation and with the springs in transversely aligned sets, means for feeding elongated sheet material into engagement with the ends of the springs, and means for progressively securing the end convolutions of the springs to each other and to the sheet material both longitudinally and transversely to form a spring unit structure, said spring securing means effecting the securing of all of the springs in each transversely aligned set substantially simultaneously.

25. Apparatus for making spring units as defined in claim 2, wherein the means for feeding the springs includes means for omitting the feeding of a set of springs at predetermined intervals.

26. Apparatus for making spring units as defined in claim 3, wherein the means for feeding the springs includes means for omitting the feeding of a number of the springs at predetermined intervals to form the secured springs into spaced groups.

27. Apparatus for making spring units as defined in claim 4, wherein the means for feeding the springs includes means for omitting the feeding of a number of the springs at predetermined intervals to form the secured springs into spaced groups.

28. Apparatus for making spring units as defined in claim 4, wherein means is provided for severing the sheet material at spaced intervals and between certain of the springs.

29. Apparatus for making spring units as defined in claim 5, wherein means is provided for severing the sheet material at spaced intervals and between certain of the springs.

30. Apparatus for making spring units as defined in claim 4, wherein means is provided for omitting the feeding of the springs at predetermined intervals, and means is provided for severing the sheet material at predetermined intervals and between certain of the springs.

References Cited in the file of this patent

UNITED STATES PATENTS

| Number | Name | Date |
| --- | --- | --- |
| 1,950,188 | Owen | Mar. 6, 1934 |
| 2,026,276 | Erickson | Dec. 31, 1935 |
| 2,250,800 | Hodges | July 29, 1941 |
| 2,330,244 | Saval | Sept. 28, 1943 |
| 2,382,226 | Hodges | Aug. 14, 1945 |

FOREIGN PATENTS

| 333,033 | Great Britain | Aug. 7, 1930 |